(12) United States Patent
Bernhardsson et al.

(10) Patent No.: US 8,057,141 B2
(45) Date of Patent: Nov. 15, 2011

(54) CARGO SUPPORT DEVICE

(75) Inventors: Nils Bernhardsson, Torslanda (SE); Johan Landén, Västra Frölunda (SE); Peter Flodin, Göteborg (SE)

(73) Assignee: Volvo Car Corporation, Gothenburg (SE)

( * ) Notice: Subject to any disclaimer, the term of this patent is extended or adjusted under 35 U.S.C. 154(b) by 378 days.

(21) Appl. No.: 12/328,400

(22) Filed: Dec. 4, 2008

(65) Prior Publication Data

US 2009/0146445 A1 Jun. 11, 2009

(30) Foreign Application Priority Data

Dec. 7, 2007 (EP) .................................. 07122585

(51) Int. Cl.
*B60P 7/08* (2006.01)
(52) U.S. Cl. ........................ 410/94; 410/120; 410/121
(58) Field of Classification Search .................... 410/18, 410/31, 32, 77, 80, 89, 94, 95, 120, 121, 410/127–129, 140, 143; 296/37.8, 37.5, 296/37.14, 37.16; 224/553, 556, 925, 403, 224/404, 43.35, 567, 42.33, 42.34, 282, 549; 248/97, 150, 434, 351
See application file for complete search history.

(56) References Cited

U.S. PATENT DOCUMENTS

| 4,540,213 | A | | 9/1985 | Herlitz et al. | |
|---|---|---|---|---|---|
| 5,167,479 | A | * | 12/1992 | Bott | ............................ 410/121 |
| 5,492,257 | A | | 2/1996 | Demick | |
| 6,811,196 | B2 | * | 11/2004 | Gammon | |

FOREIGN PATENT DOCUMENTS

| CA | 2364084 | 6/2003 |
|---|---|---|
| DE | 10244768 | 4/2004 |
| EP | 0667260 | 8/1995 |
| FR | 2767099 | 2/1999 |
| GB | 2306143 | 4/1997 |

OTHER PUBLICATIONS

European Search Report mailed May 8, 2008, 5 pages.

* cited by examiner

*Primary Examiner* — Stephen Gordon
(74) *Attorney, Agent, or Firm* — Price Heneveld LLP

(57) ABSTRACT

The invention relates to a cargo support device in a vehicle, which device is provided in a load floor of a load compartment. The cargo support device comprises a frame, which is foldable between a horizontal rest position, and an operative position, angled in relation to the load floor. The load floor is provided with a recess wherein the frame is arranged in the rest position. The frame is provided with an arm, foldable to an angled position in relation to the frame, in the operative position.

15 Claims, 4 Drawing Sheets

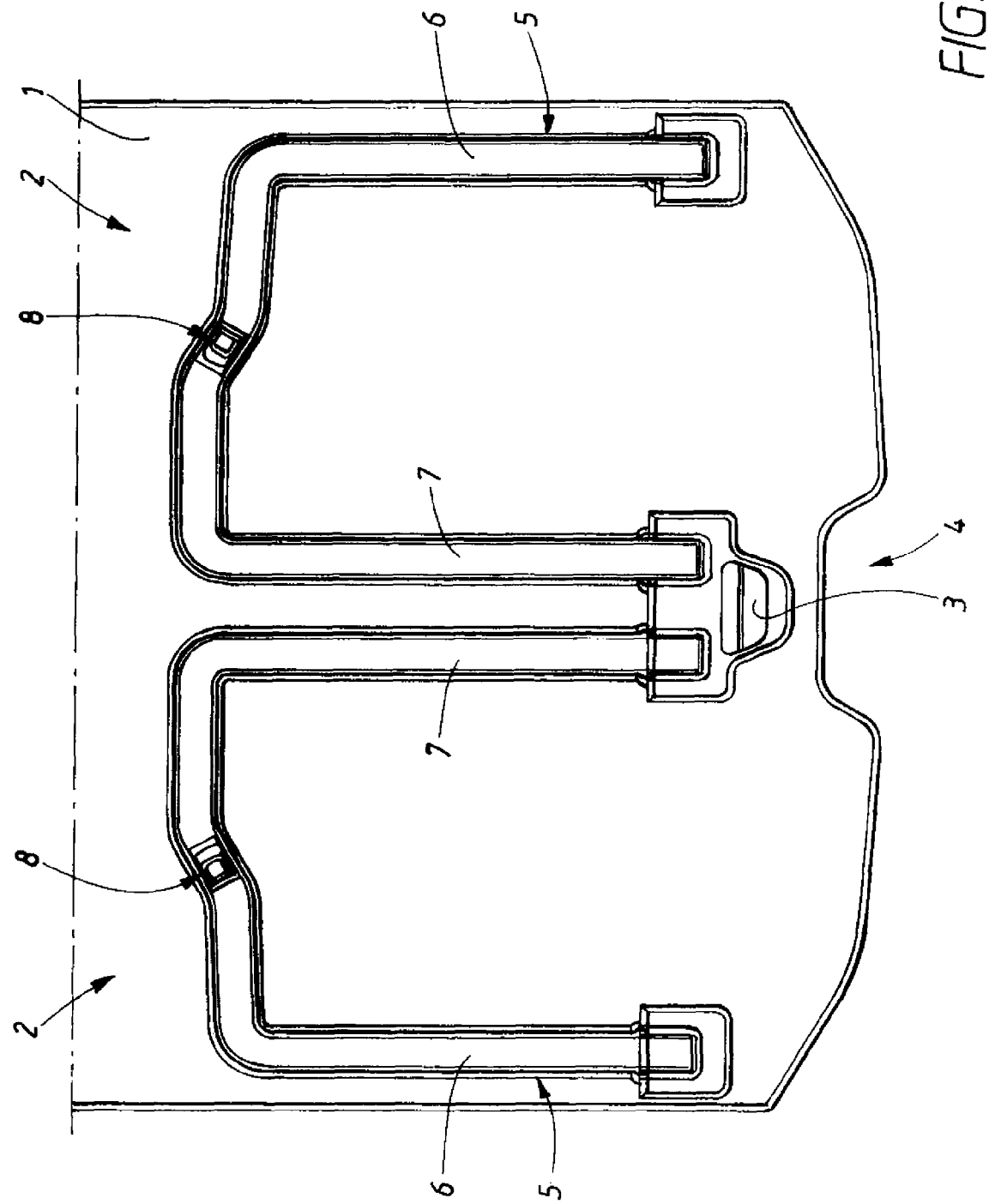

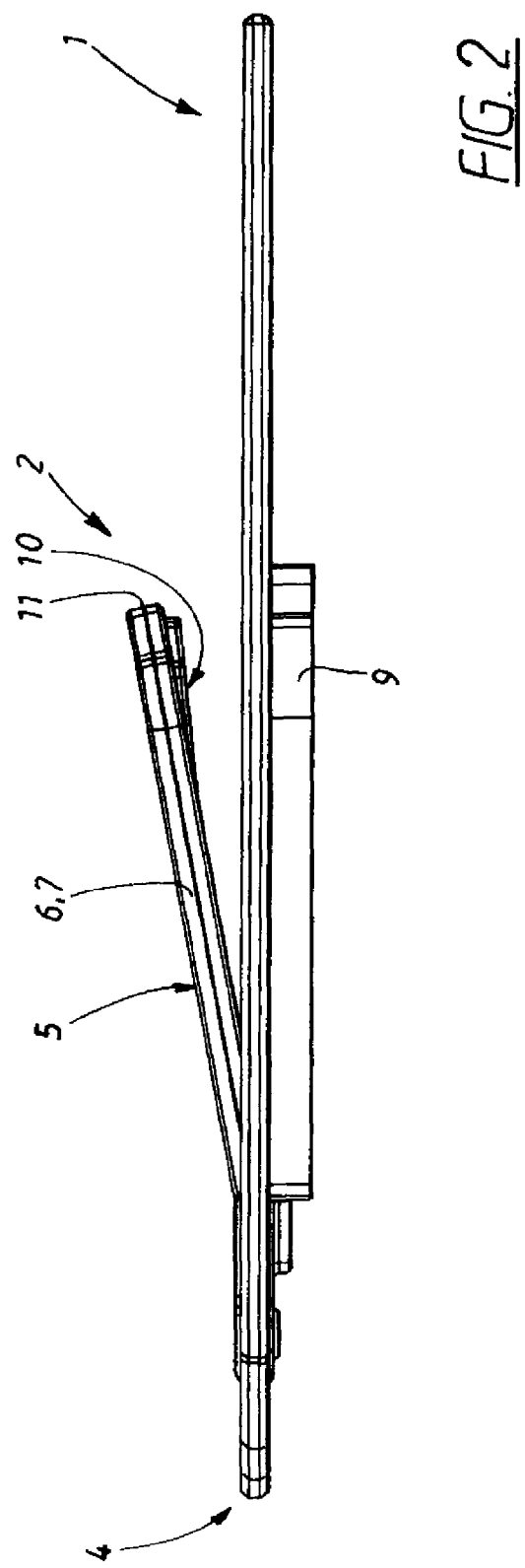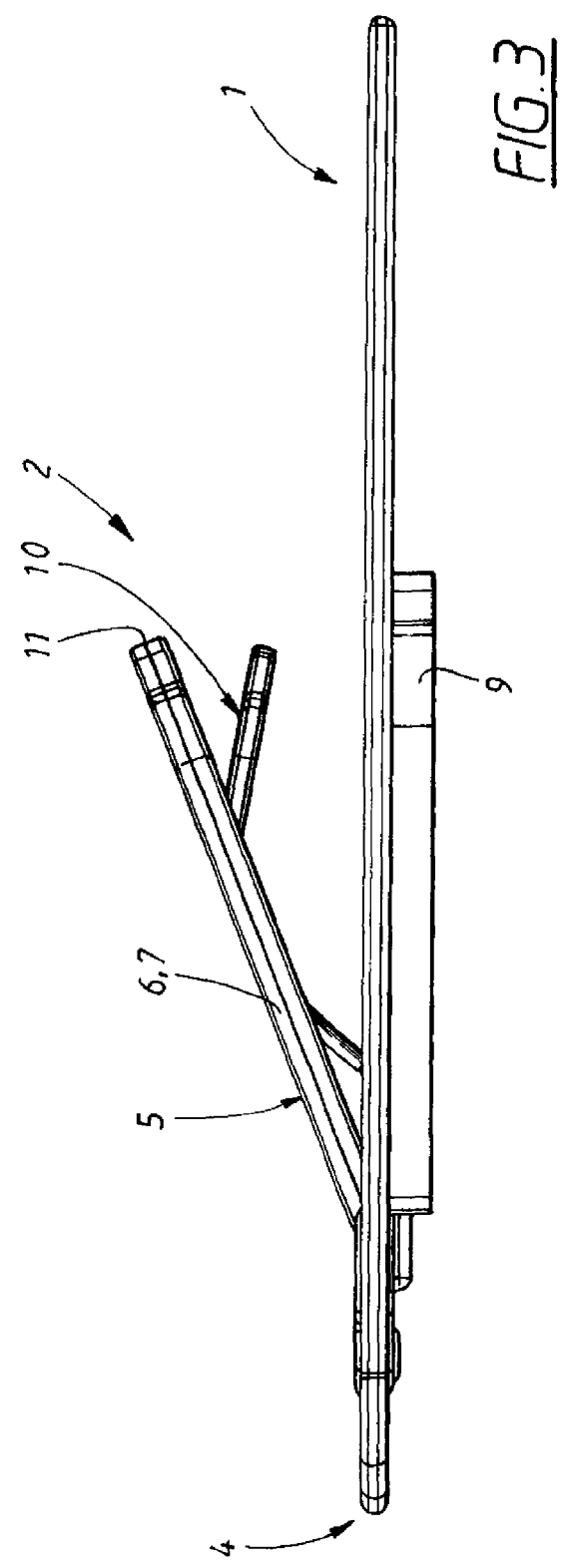

CARGO SUPPORT DEVICE

FIELD OF THE INVENTION

The present invention relates generally to a cargo support device for use in a load compartment of a vehicle, which cargo support device keeps loads, such as grocery bags, in place in the load compartment during driving.

BACKGROUND ART OF THE INVENTION

Vehicle interiors are configured with a cargo or load compartment. The load compartment is a relatively large free space without any separating devices. This implies that when smaller loads, such as grocery bags and small parcels, are to be transported, these tend to slide around in the load compartment during driving, and the contents of the bags tend to fall out and roll around in the load cargo or storage compartment, since the bags are not fastened. Thus, objects that fly around in the cargo or load compartment can also cause damage to details in the compartment or damage the interior of the cargo or luggage compartment.

Prior art cargo support devices have been proposed to address this problem. One of the cargo support devices of today arranged in a load compartment of a vehicle comprises a load floor with a door that can be raised around a transverse axis of the vehicle. The door extends substantially across the whole width of the load floor. Underneath the load floor there is provided one or more immersions, where the cargo can be placed during driving. The transverse axis is provided in the vicinity of the rear seat rest of the vehicle to uncover as big of an area as possible where the cargo can be placed. During driving, the cargo is kept in place with a resilient string that extends over and around the cargo or the cargo is hung up on hooks, provided on an underside of the door. After the transport of the cargo, the cargo is unloaded, whereafter the door is returned to its original position to form a conventional load floor of the load compartment.

The cargo or load compartments of vehicles of today usually contain varying loose objects or different accessories such as transport cages for pets, protective mats which cover the whole cargo or storage compartment, etc. To be able to use the above described cargo support device the cargo or storage compartment has to be totally emptied and thus the objects or the accessories have to be removed before the cargo support device can be used. This is thus not especially practical for the user.

It is therefore desirable to provide an improved cargo support device, which can be used even when the load compartment contains objects or accessories, and which, when not in use, can easily be folded and stored in the vehicle.

It is further desirable to provide a cargo support device that provides sufficient support for the loads during driving, such that they remain in a predetermined space during transport.

SUMMARY OF THE INVENTION

The above problems have been solved by a device according to the appended claims.

According to one aspect of the present invention, a cargo support device is provided in a vehicle, which device is provided in a load floor of a load compartment. The device comprises a frame, which is foldable between a horizontal rest position, and an operative position, angled in relation to the load floor. The load floor is provided with a recess in which the frame is arranged in the rest position. The frame comprises first and second legs attached by pivot joints to the load floor at a first end and connected by a transverse section at a second end. The transverse section is oriented in a horizontal direction in the rest position, and the first and second legs are oriented in a horizontal direction in the rest position and in an angled direction in the operative position.

According to further aspects of the present invention, each of the first and second legs of the frame can be provided with one or more fastening straps. The fastening straps on the first leg and second leg are connected and extend between the first and second legs. The straps will keep the load or cargo in place during driving and prevent the load or cargo to slide backwards towards the boot lid.

According to other aspects of the present invention, the frame is provided with an arm, foldable to an angled position in relation to the frame, in the operative position. The frame is U-shaped and the arm is U-shaped. The arm is contained within a cavity in the frame, in the rest position. The cavity of the frame is formed by a U-shaped cross-section. The arm has thus an external shape that corresponds to the inner shape of the frame, not shown. The U-shaped arm is oriented to coincide with the U-shape of the frame.

According to another aspect of the present invention, the U-shaped frame is foldable around pivot joints provided at ends of the first and second legs of the U-shaped frame.

In further aspects of the invention, the cargo support device is provided with one or more lifting devices, attached to the recess in the load floor and on the U-shaped frame. The lifting devices convey the U-shaped frame between the rest position and the operative position. The lifting devices also maintain the U-shaped frame in the operative position. The lifting devices are gas springs, torsion springs or some other suitable alternative.

According to additional aspects of the present invention, the U-shaped arm is pivotally arranged in its ends on the U-shaped frame. Rotary damping devices or similar damping devices are attached to the U-shaped arm and the U-shaped frame, in order to dampen the pivoting movement of the U-shaped arm during activation into the operative position.

According to various further aspects of the present invention, the cargo support device has a locking device, provided on the transverse section of the U-shaped frame, to block the cargo support device in the rest position. The gas springs, the arm and the major part of the locking device are arranged in the U-shaped cross-section of the frame, in the rest position. The arm and the frame can have various shapes. In the description the U-shape is only given as an example. One or more of the cargo support device can be used independently of each other.

Various embodiments of the cargo support device are possible and according to another aspect of the present invention in which the frame comprises first and second legs attached by pivot joints to the load floor at a first end and connected by a transverse section at a second end, whereof transverse section is oriented in a horizontal direction in the rest position, and the first and second legs are oriented in a horizontal direction in the rest position and in an angled direction in the operative position. The transverse section is articulated and the transverse section corresponds to the arm. The articulated transverse section is oriented in a horizontal direction in the operative direction.

The transverse section can have various shapes. In the description the U-shape is only given as an example.

According to another aspect of the invention, the cargo support device has a section of the frame that is contained within a cavity in the arm, in the rest position.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

FIG. 1 shows a view from above of the cargo support device in a rest position in a load floor of a load compartment in a vehicle;

FIG. 2 shows a side view of the cargo support device of FIG. 1, in a partially raised position;

FIG. 3 shows a side view of the cargo support device of FIG. 2 in a partially raised position;

DETAILED DESCRIPTION OF THE PREFERRED EMBODIMENTS

Figure 4:
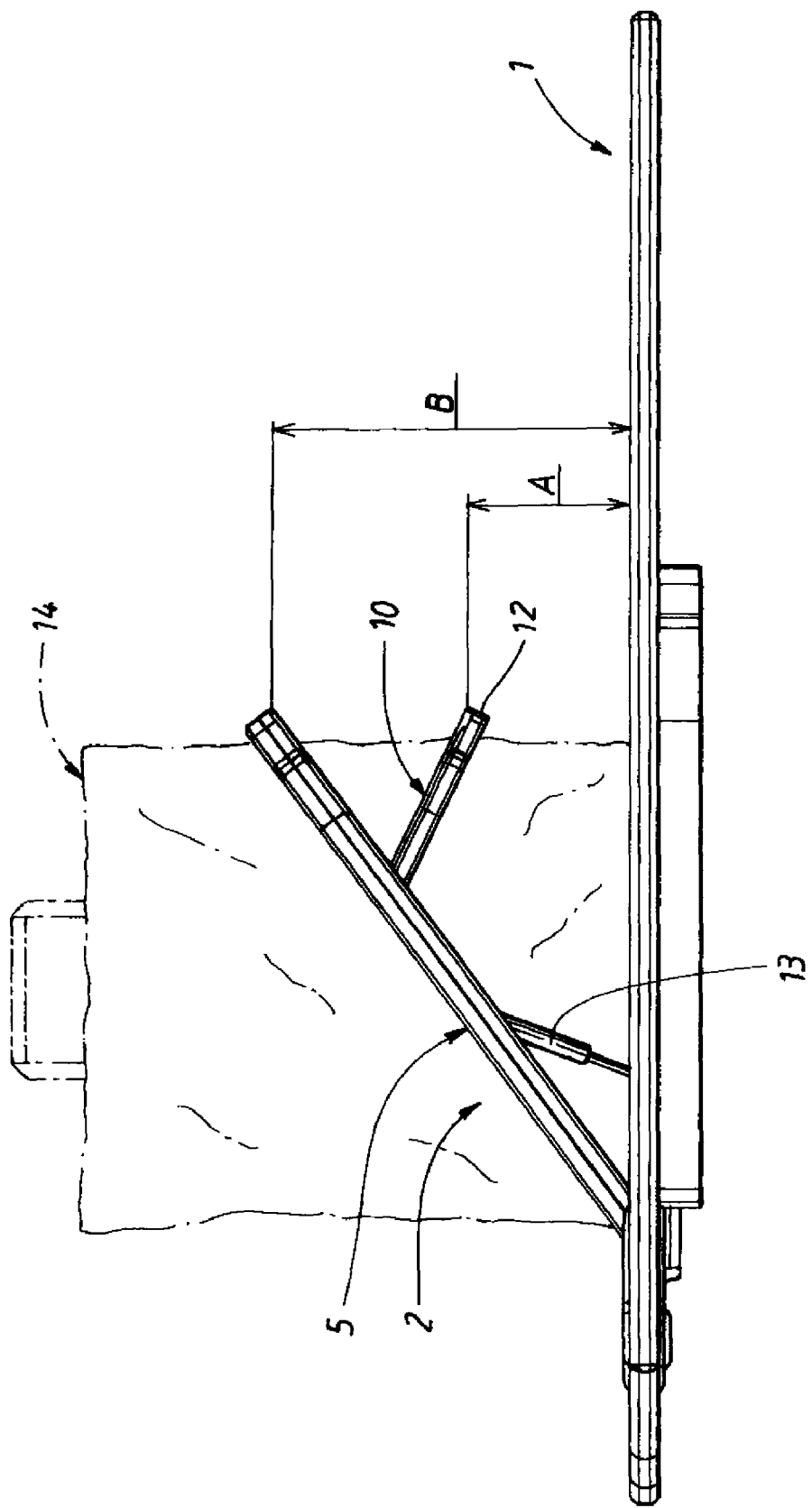
FIG. 4 shows a side view of the cargo support device of FIG. 2 in a fully raised position.

In the description below various directions are given e.g. rear, front, up, down etc. These directions are given with reference to the front and rear of the vehicle, when the vehicle is in a forward driving motion.

FIG. 1 shows a view from above of a load floor 1 in a load compartment of a vehicle, which load floor 1 is provided with two cargo support devices 2 according to one embodiment of the invention. In the description below one cargo support device 2 is going to be described, since the cargo support devices 2 have the same construction and can be used independently of each other.

The load floor 1 is provided with a handle 3, which is used to lift the load floor 1 when e.g. the spare wheel is going to be used. The cargo support device 2 is thus entirely provided in the load floor 1 and can be lifted together with the load floor 1.

The cargo support device 2 is arranged as close as possible to the rear end 4 of the load compartment, to make it as easy as possible for the user to use and release the cargo support device 2 from a rest position, on a level with the load floor 1, to a raised state in the operative position.

The cargo support device 2 comprises a frame 5, which is U-shaped. The frame 5 is foldable around pivot joints provided at ends of first and second legs 6, 7 of the U-shaped frame.

The cargo support device 2 has a locking device 8 provided on the frame 5, to block the cargo support device 2 in the rest position as shown in FIG. 1. The locking device 8 is preferably a sliding lock which is biased in the locked position.

FIGS. 2 and 3 shows side views of the cargo support device 2 in a partially raised position, at raising and activation of the cargo support device. The load floor 1 is provided with a recess 9 wherein the frame 5 is arranged in the rest position. The cargo support device 2 is provided with an arm 10 which automatically and gradually will be folded down when the cargo support device 2 is released from its rest position, in the load floor 1.

The frame has a transverse section 11 and first and second legs 6, 7, whereof the transverse section 11 is oriented in a horizontal direction in the rest position and in an angled direction, in relation to the load floor 1, in the operative position. The first and second legs 6, 7 are oriented in a horizontal direction in the rest position and in an angled direction, in relation to the load floor 1, in the operative position.

FIG. 4 shows a side view of the cargo support device 2 of FIGS. 2 and 3 in a fully raised position. The frame 5 is foldable between the horizontal rest position, as shown in FIG. 1, and an operative position, as shown in FIG. 4, angled in relation to the load floor 1. The frame 5 is provided with the arm 10, foldable to an angled position in relation to the frame 5, in the operative position. The transverse section 11 of the frame is provided on a distance B above the load floor 1, approximately 250-400 mm in the operative position. A lower part 12 of the arm 10 is provided on a distance A above the load floor 1, approximately 70-200 mm in the operative position.

The cargo support device 2 is provided with lifting devices 13. The lifting devices 13 convey the frame 5 between the rest position and the operative position and maintain the frame 5 in the operative position. The lifting devices 13 are preferably dynamic dampened. The gas springs exert a force of approximately 80-150 N on the frame 5 in the operative position.

FIG. 4 also shows a bag 14, preferably a grocery bag, contained in the cargo support device 2. One or more bags, small and large, can be contained side by side in the device 2, due to the size of the bags. Furthermore, the frame 5 and the arm 10 will support large and tall bags 14 during transport and the arm 10 will support smaller and low bags 14.

Figure 5:
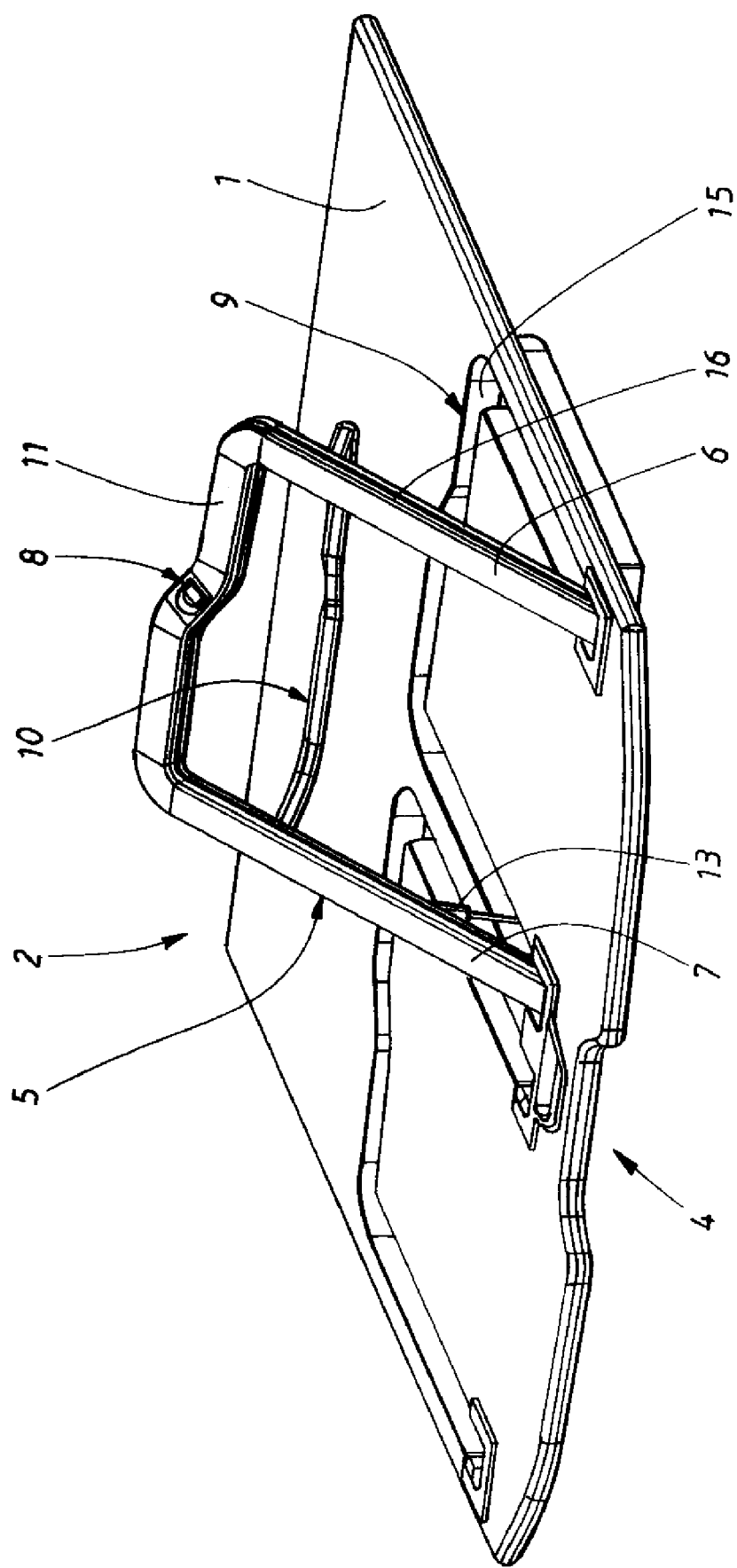
FIG. 5 shows an isometric view of one cargo support device of FIG. 4 in a fully raised position.

FIG. 5 shows an isometric view of the cargo support device 2 in a fully raised position. The lifting devices 13 are attached to the recess 9 in the load floor 1 and on the frame 5.

The recess 9 in the load floor 1 is shown, wherein the frame 5 is arranged in the rest position. The inner shape 15 of the recess 9 in the load floor 1 thus corresponds to the external shape 16 of the frame 5.

The arm 10 is U-shaped and pivotally arranged in its ends on the U-shaped frame 5. Rotary damping devices are attached to the arm 10 and the frame 5, in order to dampen the pivoting movement of the arm 10 during activation into the operative position, when the locking device 8 is released. The rotary damping devices are preferably rotational dampers which have silicon as a damping material.

The locking device 8 is provided on the transverse section 11 of the U-shaped frame 5, to prevent the frame 5 from distorting in the rest position, due to the force influence from the lifting devices 13.

The cargo support device 2 is raised to the operative position by releasing the locking device 8, whereafter the lifting devices 13 will turn the frame 5 from the rest position to the operative position, and during this motion the arm 10 will be turned to the position angled in relation to the frame 5. The cargo support device 2 is brought back to its rest position in the load floor 1 by pushing, by hand, the transverse section 11 of the frame 5 towards the load floor 1. When the arm 10 touches the load floor 1, the arm 10 will slide along the load floor 1 until the arm 10 approaches the recess 9. The arm 10 then remains in the recess 9 until the frame 5 is pushed down to the rest position, whereafter the frame 5 and arm 10 again is locked in the rest position by the locking device 8.

The frame 5 is shown with the first and second legs 6, 7. One of the legs, in this embodiment, the second leg 7 is preferably longer than the first leg 6, to attain support for both large and small bags. The bags with a wide configuration are placed along the second leg 7, wherein the bags do not protrude as much toward the boot lid as if they should be placed along the first leg 6 and the bags with a thin configuration are placed along the first leg 6, respectively.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

We claim:

1. A cargo support device in a vehicle, which device is provided in a load floor of a load compartment, said device comprises a frame, which is foldable between a horizontal rest position, and an operative position, angled in relation to the load floor, and a recess in the load floor in which the frame is arranged in the rest position, wherein the frame comprises first and second legs attached by pivot points to the load floor at a first end and connected by a transverse section at a second end, whereof the transverse section is oriented in a horizontal direction in the rest position, and the first and second legs are oriented in a horizontal direction in the rest position and in an angled direction in the operative position, wherein the frame is provided with an arm, foldable to an angled position in relation to the frame, in the operative position, wherein the arm is U-shaped.

2. The cargo support device according to claim 1, wherein the transverse section is articulated, and oriented in a horizontal direction in the operative position.

3. A cargo support device in a vehicle, which device is provided in a load floor of a load compartment, said device comprises a frame, which is foldable between a horizontal rest position, and an operative position, angled in relation to the load floor, and a recess in the load floor in which the frame is arranged in the rest position, wherein the frame comprises first and second legs attached by pivot points to the load floor at a first end and connected by a transverse section at a second end, whereof the transverse section is oriented in a horizontal direction in the rest position, and the first and second legs are oriented in a horizontal direction in the rest position and in an angled direction in the operative position, wherein the frame is provided with an arm, foldable to an angled position in relation to the frame, in the operative position, wherein the frame is U-shaped and the arm is U-shaped.

4. The cargo support device according to claim 1, wherein the arm is contained within a cavity in the frame, in the rest position.

5. A cargo support device in a vehicle, which device is provided in a load floor of a load compartment, said device comprises a frame, which is foldable between a horizontal rest position, and an operative position, angled in relation to the load floor, and a recess in the load floor in which the frame is arranged in the rest position, wherein the frame comprises first and second legs attached by pivot points to the load floor at a first end and connected by a transverse section at a second end, whereof the transverse section is oriented in a horizontal direction in the rest position, and the first and second legs are oriented in a horizontal direction in the rest position and in an angled direction in the operative position, wherein the frame is provided with an arm, foldable to an angled position in relation to the frame, in the operative position, wherein a section of the frame is contained within a cavity in the arm, in the rest position.

6. The cargo support device according to claim 3, wherein the U-shaped arm is oriented to coincide with the U-shape of the frame.

7. The cargo support device according to claim 3, wherein the U-shaped frame is foldable around pivot joints provided at ends of the first and second legs of the U-shaped frame.

8. The cargo support device according to claim 3, wherein said device is provided with one or more lifting devices, attached to the recess in the load floor and on the U-shaped frame, which lifting devices convey the U-shaped frame between the rest position and the operative position.

9. The cargo support device according to claim 8, wherein the lifting devices maintain the U-shaped frame in the operative position.

10. The cargo support device according to claim 8, wherein the lifting devices are gas springs.

11. The cargo support device according to claim 3, wherein the U-shaped arm is pivotally arranged at ends on the U-shaped frame.

12. The cargo support device according to claim 11, wherein rotary damping devices are attached to the U-shaped arm and the U-shaped frame, in order to dampen pivoting movement of the U-shaped arm during activation into the operative position.

13. The cargo support device according to claim 3, wherein the device has a locking device, provided on the transverse section of the U-shaped frame, to block the cargo support device in the rest position.

14. A vehicle having a load compartment including a load floor, said vehicle comprising a cargo support device comprising a frame, which is foldable between a horizontal rest position, and an operative position, angled in relation to the load floor, and a recess in the load floor in which the frame is arranged in the rest position, wherein the frame comprises first and second legs attached by pivot points to the load floor at a first end and connected by a transverse section at a second end, whereof the transverse section is oriented in a horizontal direction in the rest position, and the first and second legs are oriented in a horizontal direction in the rest position and in an angled direction in the operative position, wherein the frame is provided with an arm, foldable to an angled position in relation to the frame, in the operative position, wherein the arm is U-shaped.

15. The vehicle according to claim 14, wherein the frame is U-shaped.

* * * * *